Patented Apr. 6, 1926.

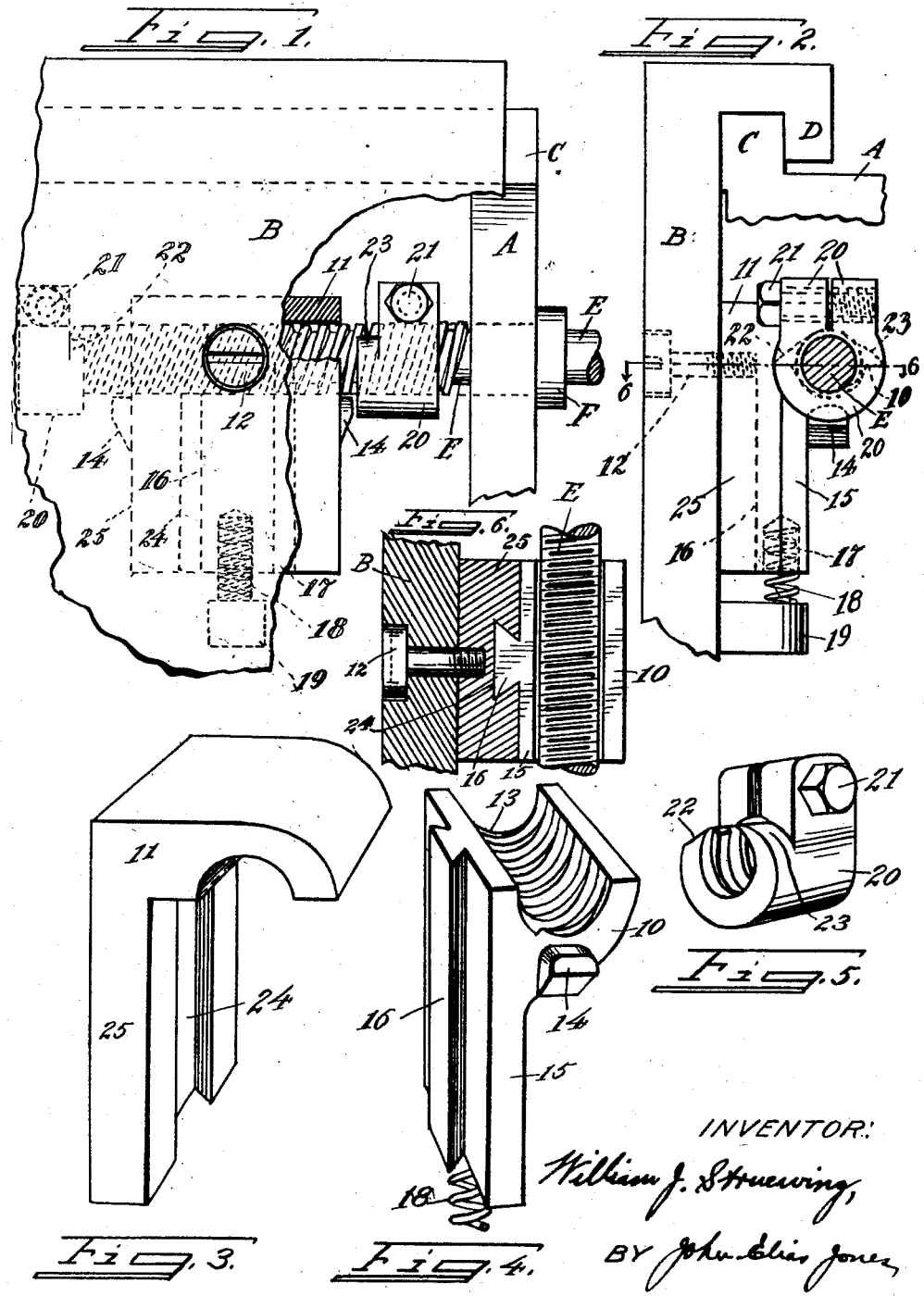

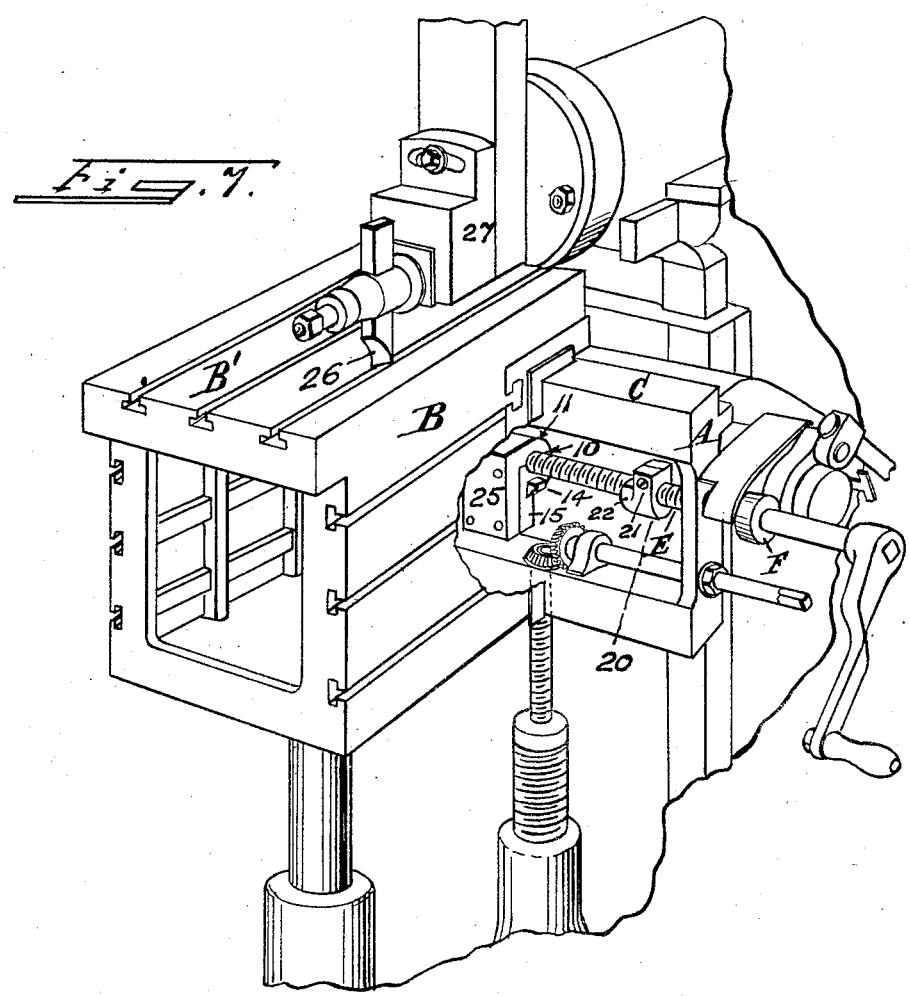

1,579,847

UNITED STATES PATENT OFFICE.

WILLIAM J. STRUEWING, OF CINCINNATI, OHIO, ASSIGNOR TO THE SMITH & MILLS COMPANY, OF CINCINNATI, OHIO, A CORPORATION OF OHIO.

SHAPER.

Application filed September 4, 1923. Serial No. 660,776.

*To all whom it may concern:*

Be it known that I, WILLIAM J. STRUEWING, a citizen of the United States of America, and a resident of Cincinnati, in the county of Hamilton and State of Ohio, have invented a certain new and useful Improvement in Shapers, of which the following is a specification.

This invention relates to metal-shaping machines, and, more particularly, to the automatic control of the operation of the reciprocating table or platen on which the work is placed and carried in reciprocal relation to the tool or cutter that is mounted on the pillar or column of the body-portion of the machine as customary.

The object of my invention is to provide means for automatically throwing out or releasing the driving-connection between the actuating cross-feed screw of said table and the coupler-nut on the inner face of the table apron, whereby the further movement of said table in either direction is instantly checked and stopped and material injury to the machine, on account of neglect or oversight on the part of the attendant to reverse the table at the desired end of its stroke, absolutely obviated and prevented.

The details of structure of the improved stop or automatic nut-release device herein will be fully described in connection with the accompanying sheet of drawings, in which—

Figure 1 is an elevation of a fragmentary portion of the table apron and the adjacent cross-rail of the machine, showing the cross-feed screw that is mounted as customary in the said cross-rail, adjustable cam-dogs on said screw for automatically throwing the lower section or driver-nut-proper of the table driving-connection downwardly out of actuated-engagement with the thread of said screw, and, also, showing partly in section, the companion coupler-member or housing that is mounted on the inner face of the said apron for driverless-capping of the said screw over the said nut-proper; Fig. 2, a fragmentary side elevation of the parts seen in Fig. 1, showing the cross-feed screw in section, and with the apron and cross-rail broken off; Fig. 3 a perspective view of the coupler-member or housing that is mounted on the inner face of the apron, taken alone; Fig. 4, a perspective view of the driver-nut-proper of the movable shifter-part of the coupler device used for detachably-connecting the reciprocating table or platen with the cross-feed screw of the machine; Fig. 5, a perspective view of one of the cam-dogs, taken alone; Fig. 6, a sectional plan of the improved coupler herein, (taken on the line 6, 6, of Fig. 2), showing its connection with the table apron and the cross-feed screw, both of which latter parts of the machine are shown broken off; and Fig. 7, a perspective view of the machine to more clearly show the work-table portion thereof, with some of the parts being shown broken off.

The special form of coupler device herein, between the machine cross-rail and the work table or platen, for use in connection with the usual cross-feed screw to reciprocate the table back and forth along the cross-rail in feed-relation to the cutting or dressing tool that is supported in reciprocating position by said cross-rail and projects from the main pillar or column of the machine body or main-frame in the path of the article or piece of material to be worked upon, in the planer or like operation of the machine, I will now proceed to describe in detail.

In the first place, A indicates the usual cross-rail portion of the machine-body to which the apron B of the usual work-table B', as shown in Fig. 7, is slidingly-connected by means of an upright flange C (on the cross-rail) and a downturned flange D (on the apron), the latter being as best shown in Fig. 2. E is the usual cross-feed screw journaling in the said cross-rail and having a collar F, suitable ratchet-pulsating devices G, shown in Fig. 7, being provided on said cross-rail to intermittingly rotate the said screw in moving or feeding the said table or platen, with the work mounted thereon, back and forth, in relation to the cutting or dressing tool 26, shown in Fig. 7, on the ram 27 of the machine, as usual, for the desired operation on said work in the forward reciprocations of the tool and table in alternately crossed relation. Heretofore, this cross-feed screw has been connected with the table apron by means of a nut structure that would not permit of its automatic release at the end of each of the strokes of the table, and it has been necessary for the attendant to watch his machine very intently at the close of each stroke of the table to necessarily enable or cause him to personally or manually reverse said screw, for if he did not time such reversal accurately and perform it promptly the result would be a serious jamming of his machine, and the consequent breaking of the weakest part thereof that would not stand the strain under the power of said screw. It is in direct connection with said nut coupling that my invention herein has most to do and I here state that I make it in two distinct, separate and separable, associated members or parts 10 and 11, the part 10 being the driving-member, or really, the nut-proper, and the part 11 being the complementary or companion adjunct-nut member or housing that is mounted on the inner face of the said apron B, being attached thereto by means of a horizontal screw 12 that is in central transverse alignment with the said cross-feed screw E, as best shown in Figs. 1 and 2. The said nut-member 10 of the coupler is of semicircular cross-section and its concave open top is threaded, as shown at 13, to coincide with the thread along the surface of the cross-feed screw E which is intended to propel or drive it back and forth in the operation of the table in connection with the cutting or dressing tool.

A rounded-top lug-formation 14 projects from each of the opposite ends of the nut-member 10, and a downturned body-portion or bar 15 extends from the latter, as best seen in Fig. 4, such bar 15 having on its back or rear-face a central, vertical dovetail-formation or rib 16, and in its bottom-end it has a socket 17, that is shown in dotted lines in Figs. 1 and 2, to accommodate a vertical spiral spring 18 that rests or stands on the horizontal lug 19 projecting from the said inner face of the apron B, in central vertical alignment with the said dovetail-rib 16 so that the nut-proper 10 is normally held under elastic pressure upwardly in driving-contact with the threaded surface of the cross-feed screw under normal working conditions, ready for immediate or instant parting away from said driving-contact when said working conditions change at the time of reversing the stroke of the work-table, and thus preventing any jamming-contact of the table, or any parts thereof, with adjacent parts of the machine that would become injured or destroyed by the advancing feed-pressure of the driving-screw E unless the said nut-proper 10 is depressed or forced downwardly against the upward pressure or tension of said spiral spring 18 and parted from said driving-screw E, and in the manner that I shall now refer to.

Internally-threaded clamp-dogs 20, 20, are mounted on the cross-feed driving-screw E and adjustably held by means of the tightening-screws 21, at the desired points apart that it is intended the respective strokes, back and forth, the work-table shall move in relation to the reciprocating cutting-tool. These dogs have side cam-extensions 22, 23, the latter being provided for the purpose of contacting with the upper round tops of the lug-formations 14 on the opposite ends of the said nut-proper 10, and to bear against these lugs in a decided and firm manner to thereby positively depress the downturned bar 15 and cause the integral nut-proper 10 to descend and to part from intimate driving-contact with the said cross-feed screw E.

The said dovetail-back 16 of the bar 15 engages a dovetail-groove 24 made vertically in the center of the upright portion or bar 25 of the said companion or complementary adjunct-nut member or housing 11, so as to slide freely therein under the upward pressure or expansion of said spiral spring 18 and the forced contact or pressing-action of the several cam-extensions 22 and 23, in the progress of the nut-proper 10 along the cross-feed driving-screw E for shifting the work-table back and forth in its labor-service in connection with the point of the active cutting-tool on the machine.

The companion nut-member 11 is in the form of an arch whose under-surface is smooth, and it is otherwise concaved to coincide with or suit the upper periphery or surface of the said driving-screw E over which it is placed or set to act as a protective brace or housing, or the like, for the said cross-feed driving-screw, and it is not otherwise intended as a means of driving the table and its apron back and forth along the cross-rail at all.

The said companion member or component housing-part 11 is believed to be best shown in Fig. 3, in which it is detached from every other part of the machine. This member 11 is a very important and essential element of my improved two-part, vertically-separable, nut-coupling for connecting the work-table with the driving-screw E on the apron in the cross-feeding action of the table in relation to the cutting-tool 26 on the customary ram 27 that is mounted on the main part of the machine, as shown in Fig. 7, and thus an automatic anti-jamming nut device is provided for a shaper that is proof against damage to the machine in the event the operator does not immediately and manually reverse the driving-screw or stop it at the close of each stroke of the work-table, which is not necessary with my slidingly-connected automatic release or throw-out device herein that imparts safety and economy against breakage in the use of a shaper, and permits the operator to do other work, with a feeling of comfort and convenience, at the bench, or at another machine, or to leave the shaper altogether for some time, if need be, without the driving-screw being able or liable to feed the table onward in either direction when once the said release or throw-out of the nut herein is effected, and without any harm or injury whatever to the machine, or to the work going on therein. The cross-feed driving-screw E then runs free and harmless, with the driver-nut-proper 10 down and out of engagement therewith.

The arched top of the adjunct-nut member 11 braces or stabilizes the driving-screw E against any undue upward pressure of the spiral spring 18 on the nut-proper 10, especially midway or so between the ends of said screw.

An important feature of the invention lies in the fact that the automatic device herein can be readily utilized to replace any of the ordinary old forms of nut-couplings between the table and cross-rail of machines already on the market and in use, without any change being necessary in either of those essential parts of the machine.

I claim:—

A safety coupling-device for a shaping-machine, intervening between the reciprocally-movable work-table and the cross-feed driving-screw thereof and comprising a threaded half-round driven-nut member having a downwardly-disposed body-portion, a vertical dovetail rib-formation on the back of the said body-portion, horizontal lugs provided on the opposite sides of the said driven-nut member, a horizontal lug extending from the apron of the work-table beneath the lower end of said driven-nut member, an upright spiral spring resting on the said last-named lug, a socket provided in the lower end of the said body-portion of the driven-nut member and adapted to freely house and accommodate the said upright spiral spring whose vertical expansive-pressure is brought against the said driven-nut member to hold or sustain its thread in actuating-relation with the thread of said driving-screw, a companion or adjunct arched-nut member having a vertical dovetail groove-formation or guide-way adapted for the sliding-engagement therewith of the said dovetail rib-formation on the said body-portion of the driven-nut member and said adjunct arched-nut having a smooth or unthreaded underside surface adapted for free bracing and capping engagement with the upper surface of the said driving-screw, and cam-dog means adjustably-mounted on the said driving-screw to automatically and instantly depress the said driven-nut member from active engagement with the lower surface of the driving-screw when the said work-table has reached the opposite ends of its reciprocal stroke in relation to the cutter-tool on the machine, to avoid jamming-damage to the machine after the said reciprocal strokes of the work-table have been duly and properly completed, substantially as shown and described.

WILLIAM J. STRUEWING.